Sept. 8, 1970 L. R. YESKE 3,527,041
CONTROL MECHANISM FOR AGRICULTURAL IMPLEMENT
Filed May 9, 1968 4 Sheets-Sheet 1

INVENTOR.
Laurel R. Yeske
BY
SETTLE, BATCHELDER & OLTMAN.
ATT'YS.

Sept. 8, 1970  L. R. YESKE  3,527,041

CONTROL MECHANISM FOR AGRICULTURAL IMPLEMENT

Filed May 9, 1968  4 Sheets-Sheet 2

INVENTOR.
Laurel R. Yeske
BY
SETTLE, BATCHELDER & OLTMAN.
ATT'YS.

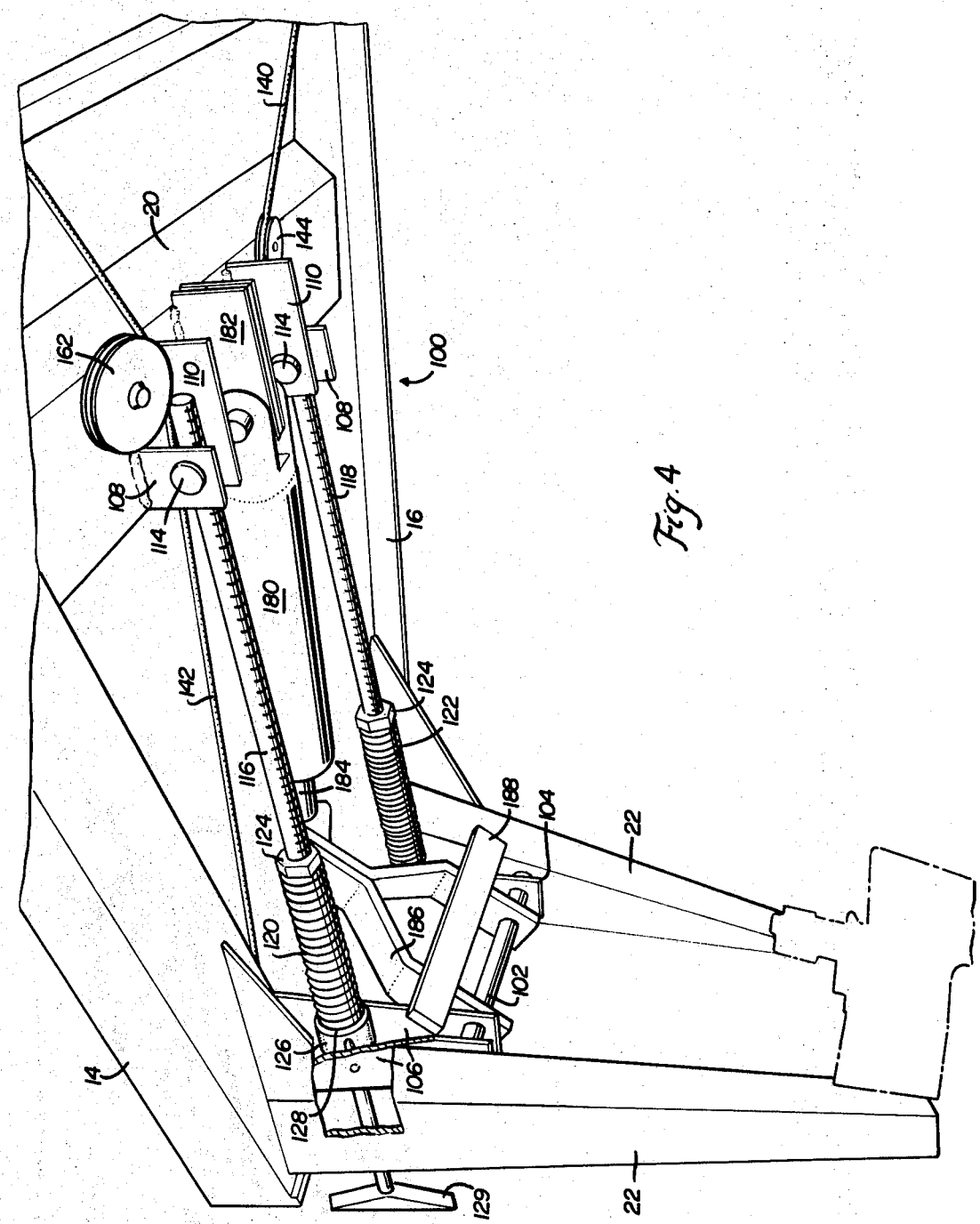

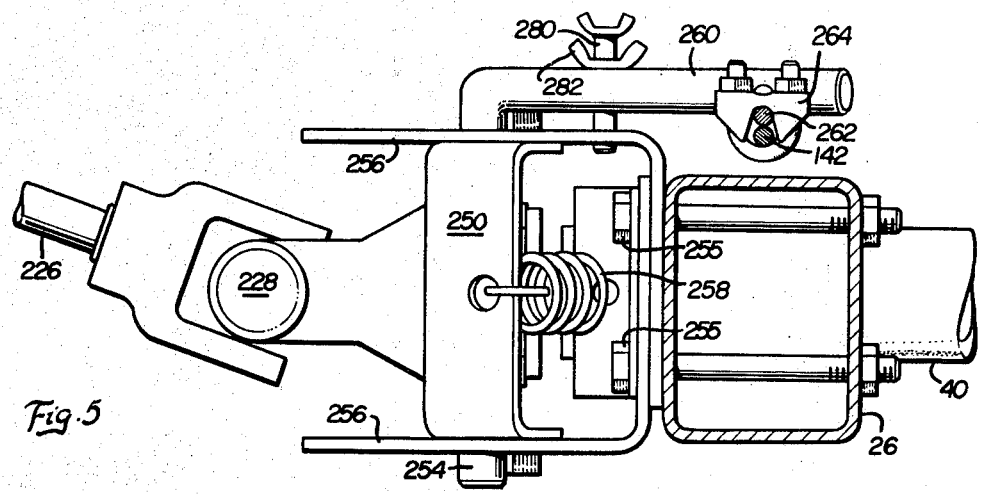
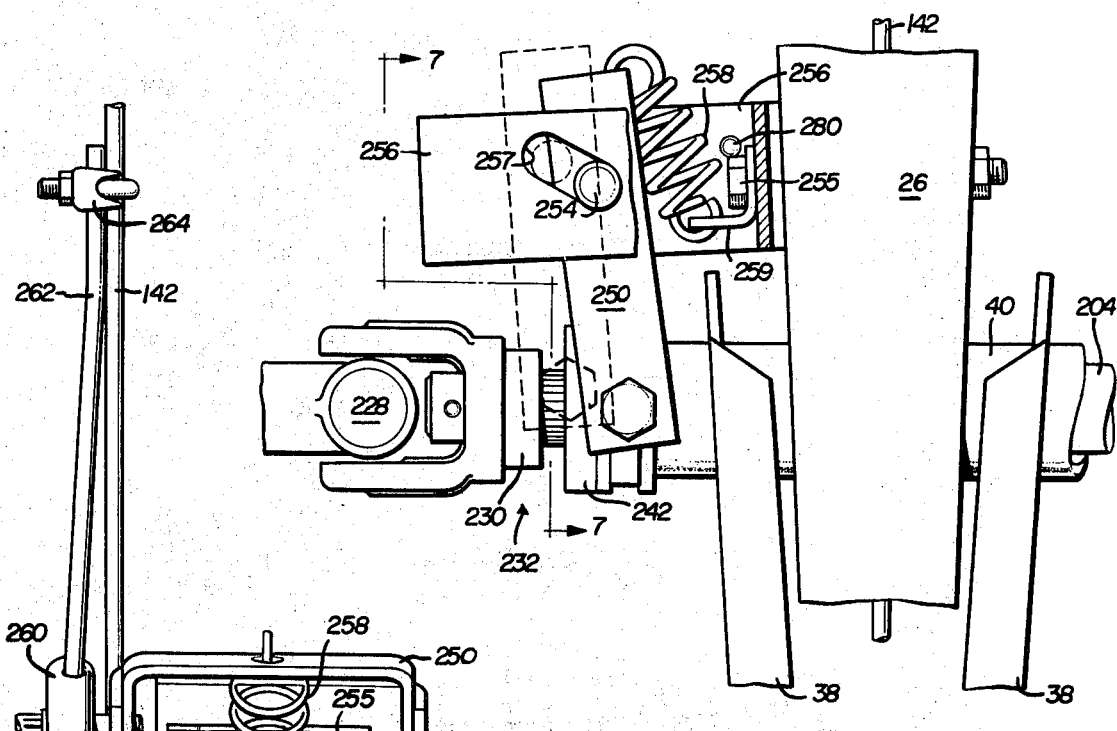
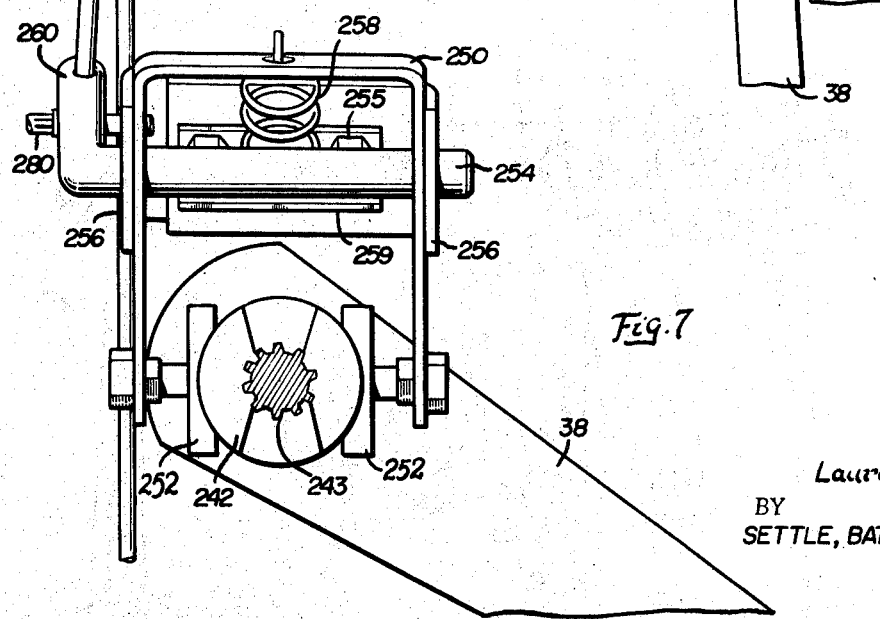

United States Patent Office 3,527,041
Patented Sept. 8, 1970

3,527,041
CONTROL MECHANISM FOR AGRICULTURAL IMPLEMENT
Laurel R. Yeske, Rockford, Ill., assignor to J. I. Case Company, Racine, Wis., a corporation of Wisconsin
Filed May 9, 1968, Ser. No. 727,791
Int. Cl. A01d 77/06
U.S. Cl. 56—377    10 Claims

ABSTRACT OF THE DISCLOSURE

A clutch actuating mechanism for a side delivery rake which allows the rake to be moved to an inoperative position while the clutch remains in the engaged position when the torque forces in the clutch are above a predetermined level. Means are included in the actuating mechanism for disengaging the clutch when the torque forces between the clutch elements are reduced below the predetermined level.

REFERENCE TO RELATED APPLICATIONS

This application contains subject matter which is common to my copending application Ser. No. 589,727, now Pat. 3,470,683, filed Oct 26, 1966 and assigned to the assignee of this application.

BACKGROUND OF THE INVENTION

The present invention relates generally to side delivery rakes and more particularly to an improved actuating mechanism for disengaging the drive mechanism for the raking reel.

Side delivery rakes conventionally include a main frame adapted to be hitched to a suitable draft vehicle and supported by a pair of ground engaging wheels. The raking reel is normally supported on a sub-frame and is movable relative to the ground between operative and inoperative positions.

In most side delivery rakes, it has been customary to provide a drive mechanism between the ground engaging wheels and the raking reel with a spring loaded clutch actuatable to selectively connect the driving wheel or wheels to the raking reel. The clutch actuating mechanism is normally associated with the spring loaded clutch and which will automatically disengage the clutch when the raking reel is moved to the inoperative position.

However, in automatic control mechanisms of this type, it has been customary to provide a direct connection between the clutch actuating mechanism and the mechanism for raising and lowering the reel between operative and inoperative positions. This means that the clutch elements must be moved to the disengaged position when the raking reel is moved to the inoperative position.

Such a mechanism has been found to have several serious drawbacks, the primary of which is that, if large torque forces are applied between the driving and driven elements of the clutch when the reel is being moved to the inoperative position, the entire drive mechanism may be damaged. Of course, such a mechanism is highly objectionable and it is imperative that certain precautions be provided so that the drive train is not damaged or distorted.

SUMMARY OF THE INVENTION

The primary object of the present invention is to provide an improved actuating mechanism for a drive train of a side delivery rake which will normally allow the actuating mechanism to be moved to a disengaged position while allowing for the drive train to remain in the engaged position until the torque forces in the drive train are reduced to a certain level.

Another object of the present invention is to provide an improved clutch actuating mechanism for a side delivery rake which automatically is moved to the disengaged position when the raking reel of the side delivery rake is moved to the inoperative position and which will allow the drive train to remain in the engaged position until the torque forces are reduced to a predetermined level.

A further object is to provide a clutch actuating mechanism which has a simple and effective lockout mechanism for insuring that the clutch cannot be engaged while the side delivery rake is being transported at high speeds.

Other objects of this invention will appear in the following description and appended claims, reference being had to the accompanying drawings forming a part of this specification wherein like reference characters designate corresponding parts in the several views.

BRIEF DESCRIPTION OF DRAWINGS

FIG. 4 is an enlarged fragmentary prospective view showing the lift and floating mechanism for moving the reel between operative and inoperative positions;

FIG. 5 is a horizontal sectional view taken along lines 5—5 of FIG. 2 showing a plan view clutch actuating mechanism of the present invention;

FIG. 6 is a side elevational view of the clutch actuating mechanism shown in FIG. 5; and FIG. 7 is a vertical sectional view taken along lines 7—7 of FIG. 6.

DETAILED DESCRIPTION

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
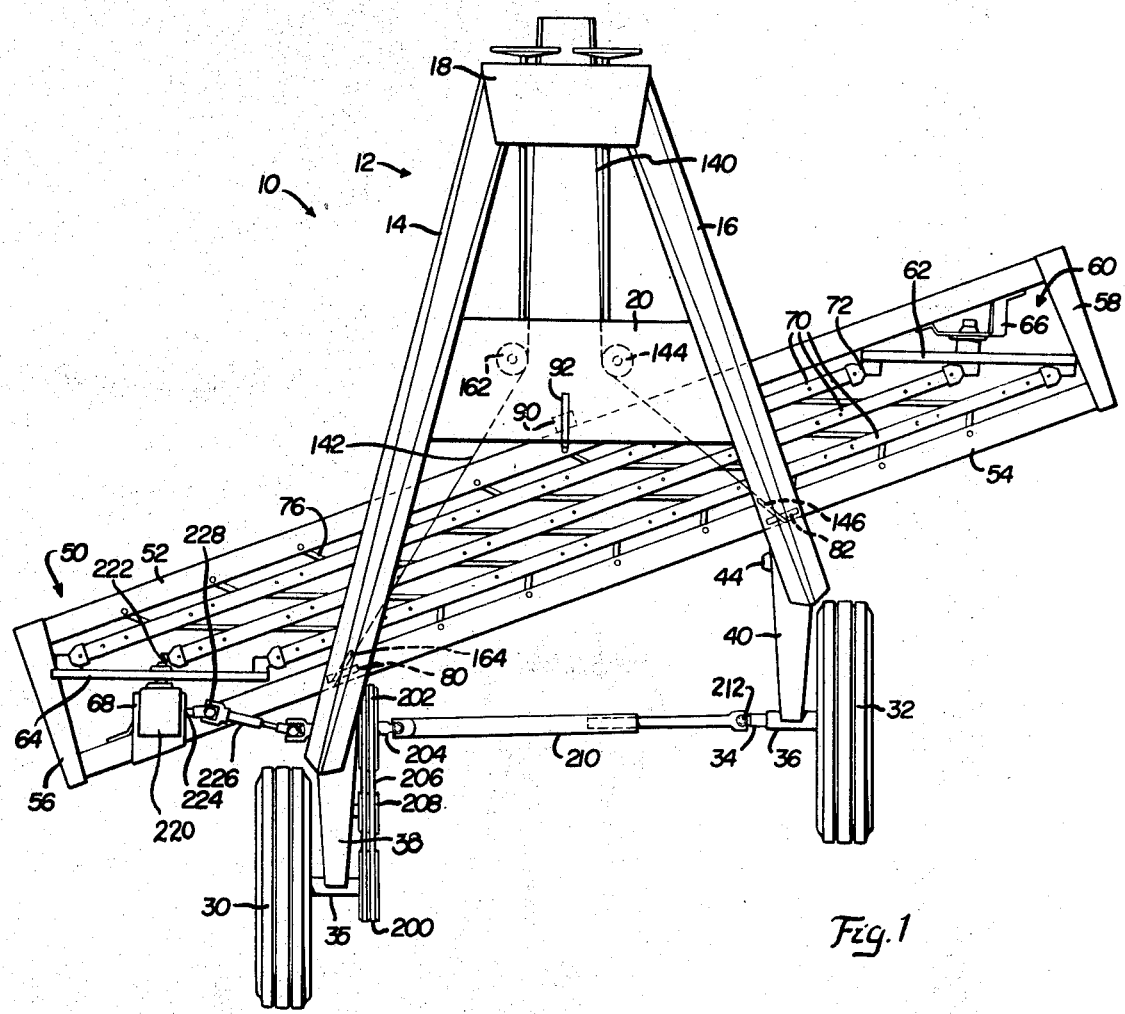
FIG. 1 is a plan view of a side delivery rake having the clutch actuating mechanism of the present invention incorporated within the drive train of the rake.
Figure 2:
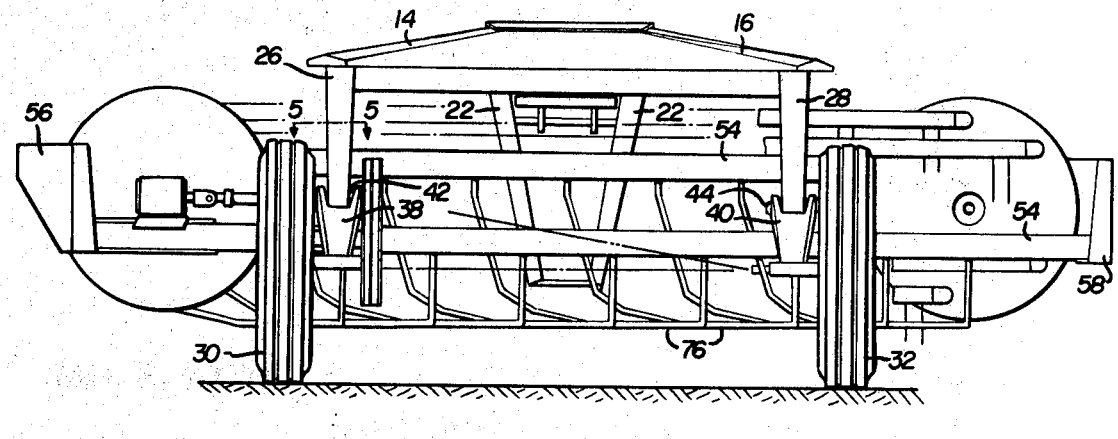
FIG. 2 is an end view of the rear end of the side delivery rake shown in FIG. 1.
Figure 3:
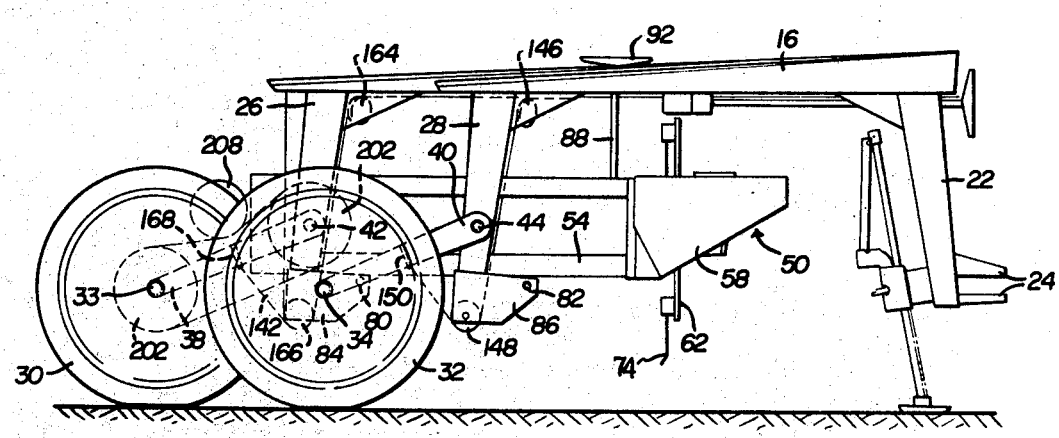
FIG. 3 is a side elevational view of the side delivery rake shown in FIG. 1.

For a proper environment for the clutch actuating mechanism of the present invention reference is made to FIGS. 1, 2 and 3 of the drawings which show a side delivery rake, generally designated as 10 having a main or first frame 12 comprising fore-and-aft extending members 14 and 16. Spaced braced members 18 and 20 interconnect the fore-and-aft members 14 and 16 to define a rugged main frame structure.

The frame 12 includes a downwardly depending member 22 (FIG. 3) at the forward end thereof which has a hitch 24 for connection to a draft or towing vehicle. The frame 12 also has, secured near the rear ends of the members 14 and 16, a pair of downwardly extending support members 26 and 28 which are fixedly secured thereto, as by welding.

The main frame 12 is supported by a pair of ground engaging wheels 30 and 32 respectively supported by shafts 33 and 34 rotatable in hubs 35 and fixed 36 to one end of pivoted arms 38 and 40. The arm 38 is pivoted at its forward end at 42 on the downwardly depending support member 26 while the arm 40 is pivoted at 44 on the downwardly depending member 28. The arms 38 and 40 will hereinafter be referred to as the second frame or sub-frame which is relatively movable with respect to the main or first frame 12.

The main frame 12 has a reel supporting frame 50 depending therefrom and disposed along a diagonal direction to the direction of movement of the side delivery rake 10, as clearly shown in FIG. 1. The raking reel frame 50 includes spaced parallel frame elements 52 and 54 rigidly interconnected at opposite ends by end members 56 and 58.

The raking reel frame 50 supports a raking reel 60 comprising end plates 62 and 64 respectively journaled on brackets 66 and 68 adjacent opposite ends of the frame 50. The raking reel 60 further includes a plurality of reel bars 70 pivoted on bearings 72 carried by the respective end plates 62 and 64. Thus, as the plates 62 and 64 are rotated, the reel bars are likewise rotated in a usual and well-known manner. Each of the reel bars 70 has a plurality of raking teeth 74 supported thereon so as to engage the material which is lying on the ground and move the material towards the left end of the side delivery rake as viewed in FIG. 1. The raking reel frame also includes a plurality of stripper bars 76 having their opposite ends respectively secured to the respective sub-frame elements 52 and 54.

The raking reel frame 50 is pivotally supported adjacent its rear lower portion by pivot pins 80 and 82 (FIGS. 1 and 3) on brackets 84 and 86 fixedly secured to the lower ends of the respectively downwardly directed arms or members 26 and 28. The forward end of the frame 50 is adjustable vertically through a threaded rod 88 received in a trunnion 90 carried by the frame element 52. Thus, rotation of the rod 88 through the manual control member 92 will raise or lower the forward end of the reel frame 50 with respect to the main frame 12. Since the feature is more particularly described and claimed in my copending application Ser. No. 589,727, no detailed description thereof appears to be necessary at this time.

The second or sub-frame including pivoted arms 38 and 40 is adapted to be moved relative to the main frame 12 by actuating means which will now be described. The actuating means or lifting and floating mechanism 100 is shown in greater detail in FIG. 4 and includes a shaft 102 fixedly secured to the spaced downwardly depending members which defined the forward member 22. The shaft 102 has two pairs of arms 104 and 106 extending upwardly therefrom and independently pivoted on the shaft 102.

Brace 20 has spaced pairs of downwardly depending ears 108 and 110, each pair of ears supporting a trunnion 114 which threadedly receives one end of rods 116 and 118, respectively. The rods 116 and 118 extend forwardly towards the downwardly depending frame member 22 and have springs 120 and 122 telescopingly received on the forward end thereof. One end of each spring engages an adjustable nut 124 on each of the respective rods while the opposite ends of the respective springs 120 and 122 normally engage thrust bearings 126 carried by the respective arms 104 and 106 (only one being shown in FIG. 4). The respective rods 116 and 118 terminate in the opposite end adjacent the respective arms 104 and 106 to define stops 128 at the forward ends thereof. A reduced portion having a hand wheel 129 on the free end thereof is connected to the forward end of each rod for adjustment of the rods with respect to the trunnions 112 and 114.

Cables 140 and 142 respectively have their forward ends connected to the upper ends of the respective arms 104 and 106. Cable 140 extends rearwardly where it is journaled over a pulley 144 rotatable on the cross brace 20 and over a second pulley 146 (FIG. 3) and thence downwardly over a third pulley 148 with the opposite end of the cable attached at 150 to the arm 40 intermediate its ends thereof. Likewise, cable 142 extends rearwardly and is journaled on a first pulley 162 rotatable on cross brace 20, a second pulley 164 rotatably supported at the juncture of member 14 and downwardly depending member 26 and a third pulley 166 rotatably journaled on the lower end of member 26 with the free end of cable 142 attached at 168 to the arm 38 intermediate the ends thereof.

Thus, the weight of the main frame 12 will normally maintain the arms 104 and 106 in engagement with the respective stops 128 defined on the forward end of the rods 116 and 118. However, the force of compression springs 120 and 122 will act against arms 104 and 106 to provide a floating action and also to assist in the lifting action, to be described hereinafter. The assisting pressure of the force of each spring provides a minimum effort to move the reel upwardly from the ground as uneven or irregular surfaces are encountered in the operation of the rake while the load of the main frame is normally supported by the arms 104 and 106 acting against the stop ends of the threaded rods 116 and 118.

The lifting mechanism or control means between the sub-frame, including arms 38 and 40, and the main frame 12 also includes a hydraulic cylinder assembly having the cylinder 180 pivoted on a lug 182 fixedly secured to the cross brace 20. The piston 184 is connected to the free end of a yoke 186 pivotally supported on shaft 102 with a bar 188 secured to one surface of the yoke and extending beyond the side edges of the yoke. Thus, extension or retraction of the piston 184 with respect to the cylinder 180 will pivot the yoke 186 on shaft 102. In extension of the piston 184 with respect to the cylinder 180, the opposite ends of the bar 188 carried by the yoke 186 will respectively engage the arms 104 and 106 to thus pivot the arms forwardly on shaft 102 thereby pivoting the respective arms 38 and 40, supporting the wheels 30 and 32, to raise the main frame 12 with respect to the ground. Of course, retraction of the piston 184 will allow the weight of the main frame to pivot the arms 38 and 40 in the opposite direction thereby lowering the main frame with respect to the ground.

All of the features of the side delivery rake thus far described are more clearly disclosed and claimed in the above mentioned copending application.

One or both wheels 30 and 32 are utilized as the drive mechanism for driving the raking reel 60. For this purpose, the drive wheel 30 has a pulley 200 secured to the free end of the shaft 33 supporting the wheel 30. A second pulley 202 is fixedly secured to a shaft 204 and the two pulleys are interconnected by a belt 206 with a tightener sheave 208 engaging the belt for adjusting the tension thereof.

The right hand wheel 32 is likewise connected to pulley 202 through a telescoping shaft 210 connected at its opposite ends respectively through universal joints 212 to the shaft 34 supporting the right wheel 32 and the shaft 204.

The frame 50 supports a gear box 220 having an output shaft 222 connected to end plate 64 and having input shaft 224 connected through an extensible shaft 226 and universal joints 228 to the first element 230 of the clutch 232. The shaft 204 (FIG. 6) is rotatable within tubular pivot 40 and has a reduced portion received in one portion of universal joint 228 to allow relative rotation between the clutch element or jaw 230 and shaft 204. The second clutch element or jaw 242 is keyed at 243 to shaft 204 to rotate therewith but is axially slidable thereon to be engageable or disengageable with clutch element 230. In prior art actuating members, clutch element or jaw 242 is normally biased into an engaged position by a compression spring. However, in prior art devices, the clutch elements must be moved to the disengaged position whenever the actuating mechanism is moved to the corresponding disengaged position.

According to the present invention, the actuating mechanism for the clutch element or jaw 242 is adapted to normally automatically move the clutch element to the disengaged position whenever the control means 100 is actuated to produce relative raising of the main frame 12 with respect to the ground engaging wheels 30 and 32 but allow for continued engagement of the clutch means 232 if the torque forces are above a predetermined level.

As clearly shown in FIGS. 5 through 7, the clutch actuating mechanism includes an actuating member or fork 250, the lower forked end of which is connected to the clutch element 242 by lugs 252 as is conventional in clutch mechanisms of this type. The actuating member 250 has a pin 254 fixedly secured thereto intermediate the ends thereof and pivoted on a bracket 256 rigidly secured, as by welding or bolts 255, to the downwardly dependent arm 26.

According to the primary aspect of the present invention, the pin 254 is supported on the bracket 256 to accommodate relative radial movement of the pin with respect to the bracket. For this purpose, the pin 254 is supported in elongated slots 257 formed in the respective legs of the bracket 256. The pin is normally maintained at the lower end of the slots 257 by a spring 258 having one end connected to the web of the fork 250 and the opposite end connected to a bracket 259 supported by the bolts 255. However, the slots will allow radial movement of the pin along the bracket as will become more apparent hereinafter.

The actuating member is normally pivoted between engaged and disengaged positions by an integral extension 260 formed as part of the pin 254 and extending perpendicular to the axis thereof horizontally to a position in front of the support member 26. The free end of the extension 260, which forms a part of the actuating member 250, has one end of a cable 262 fixedly secured thereto while the opposite end of the cable is attached through a clamp 264 to cable 142 forming part of the control means for producing relative movement between the main frame 12 and the sub-frame defined by arms 38 and 40.

Thus, in normal operation, when the piston 184 is extended to raise the main frame above the ground, the pin 254 will be pivoted on bracket 256 thereby overcoming the tension of clutch spring 258 to move the clutch element 242 to the disengaged position.

However, should the torque force between the clutch elements be sufficient to possibly cause injury to any of the parts, the present actuating mechanism accommodates relative movement between the actuating member or fork 250 and the bracket 256. Thus, should the torque forces of the clutch, exceed the force of spring 258, the lugs 252 will then act as pivot points for the fork and the spring 258 will be expanded when the extension 260 is being raised with the cables 262 and 142, the elongated slot 257 accommodating movement of the pin 254 with respect to the bracket 256.

Briefly reviewing, it can be seen that with the clutch elements 230 and 242 engaged, and a torque force above a predetermined level applied to the clutch elements, attempted counterclockwise rotation of the pin 254 will overcome the force of spring 258 to cause the pivot pin 254 to ride up along the inclined surfaces defined by the elongated slot 257 and move to the upper extreme position shown by the dotted lines in FIG. 6. As soon as the torque forces within the clutch 232 are reduced sufficiently to prevent injury to the clutch elements, the pivoted position of the pin 254 will cause disengagement of the clutch and the force of spring 258 will return the pin 254 to the solid line position of FIG. 6.

According to a further aspect of the present invention, locknut means are provided for insuring that the clutch cannot be moved to the engaged position when the side delivery rake is being transported at high speeds. For this purpose, lock means are interposed between the extension 260 and the bracket 256. This lock means is in the form of a screw 280 threaded in an opening in the extension 260 and having a lock nut or wing nut 282 threadedly received thereon. Thus, when it is desired to transport the side delivery rake between fields it is only necessary to advance the threaded screw 280 to the position shown in FIG. 5 thereby having the free end received in an opening formed in the bracket 256 to lock the extension 260 in a position corresponding to the disengaged position of the clutch. This locking mechanism will insure that there is no possibility of the clutch elements being moved to the engaged position when the side delivery rake is being transported at high speeds.

Of course, if the operator wishes to have the raking reel in driving engagement during the raising and lowering of the reel it is only necessary to disconnect the clamp 264 from the cable 142. In this condition, if the operator would want to disengage the clutch, he could manually raise the extension or fork lever 260 and utilize the lock means 280 for maintaining the clutch in disengaged position.

While one exemplary embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

I claim:

1. In a side delivery rake having first and second frames with one of said frames supporting a raking reel and the other of said frames having at least one ground engaging wheel, control means for moving said frames relative to each other to move said raking reel between operative and inoperative positions, and drive means interposed between sad at least one ground engaging wheel and said reel and including clutch means movable between engaged and disengaged positions for selectively drivingly connecting said reel to said wheel, the improvement of an actuating mechanism for moving said clutch means between said at least one ground engaging wheel and said one of said frames adjacent said clutch means, an actuating member having a pivot pin supported on said bracket means connecting said actuating member to said control means for pivoting said actuating member to a disengaged position when said raking reel is moved to the inoperative position, biasing means interposed between said actuating member and said one of said frames, and means accommodating relative movement between said pin and said bracket means whereby said actuating member may be pivoted to the disengaged position while said clutch means remains in the engaged position when the torque forces in said clutch exceed the force of said biasing means.

2. A side delivery rake as defined in claim 1, in which said last means includes means defining an elongated slot on said bracket means and receiving said pivot pin with said biasing means normally maintaining said pin in a first position at one end of said slot while accommodating movement of said pin within said slot.

3. A side delivery rake as defined in claim 1, including the further improvement of lock means incorporated in said actuating mechanism for locking said clutch means in the disengaged position and comprising a screw threadedly received in an opening in said means connecting said actuating member to said control means, and means on said bracket means receiving a portion of said screw.

4. A clutch actuating mechanism for a side delivery raking reel rotatably supported on a main frame, said main frame supported on a pair of wheels pivoted on one end of arms having the opposite ends thereof pivoted on the main frame, lift means interposed between said main frame and said arms to raise and lower said raking reel between operative and inoperative positions and drive means for said raking reel including a clutch movable between engaged and disengaged positions, comprising an actuating member pivoted at one end to said clutch means and having means defining a pin thereon, means pivotally supported said pin on said main frame, an actuating cable operatively connected to said pin and to said lift means for moving said actuating member to a disengaged position when said raking reel is moved to an inoperative position, and means accommodating relative non-rotational movement of said pin with respect to said main frame when torque forces within said clutch are above a predetermined level to allow said clutch means to remain engaged until the torque forces are reduced to said level.

5. A clutch actuating mechanism as defined in claim 4, in which said last means includes biasing means producing a force normally maintaining said pin in a first position relative to said main frame while allowing said pin to move to a second position when the torque forces exceed said predetermined level and returning said pin to said first position when the torque forces are reduced to said predetermined level.

6. A clutch actuating mechanism as defined in claim 5, in which said last means further includes means defining an elongated slot on said main frame and having opposite ends defining said first and second positions.

7. A clutch actuating mechanism as defined in claim 4, including the further improvement of lock means on said actuating member and selectively cooperating with said main frame to define a fixed disengaged position for said member and said clutch.

8. A clutch actuating mechanism as defined in claim 4 in which said last means includes means defining an elongated slot on said main frame for slidably receiving said pin, and biasing means normally maintaining said pin adjacent one end of said slot for pivotal movement at said end of said slot while accommodating longitudinal movement of said pin within said slot when said torque forces in said clutch are above the predetermined level.

9. An actuating mechanism for clutch means interposed between a drive and a driven shaft for selectively driving a raking reel supported on a frame including first and second frame elements with control means for producing relative movement between said elements to move said raking reel between operative and inoperative positions, comprising a member pivotally connected to said clutch means and defining a first pivot axis, pin means defining a second pivot axis on said member, a bracket pivotally supporting said pin means on said frame, means operatively interconnecting said member and said control means for normally pivoting said member about said second axis in response to movement of said raking reel to the inoperative positions to disengage said clutch means, and means interposed between said member and said bracket means accommodating transverse movement of said second axis with respect to said bracket means when the torque forces in said clutch means exceed a predetermined value whereby to allow said clutch means to remain engaged and cause said clutch to disengage when the torque forces are reduced to said predetermined value.

10. An actuating mechanism as defined in claim 9, in which said last means comprises means defining an elongated slot on said bracket means and receiving said pin means and biasing means between said member and said bracket means normally maintaining said pin means in a first position in said slot but accommodating movement to a second position in said slot.

References Cited

UNITED STATES PATENTS

| | | | |
|---|---|---|---|
| 2,708,822 | 5/1955 | Sutherland | 56—377 |
| 2,746,233 | 5/1956 | McClellan et al. | 56—377 |
| 2,929,192 | 3/1960 | Hill | 56—377 |
| 3,104,513 | 9/1963 | Fischer | 56—377 |
| 3,107,476 | 10/1963 | Wathen | 56—377 |

RUSSELL R. KINSEY, Primary Examiner